May 15, 1923.  1,454,888
W. GREEN
SYSTEM FOR SELLING AND PACKING FOOD PRODUCTS
Filed March 11, 1922  2 Sheets-Sheet 2
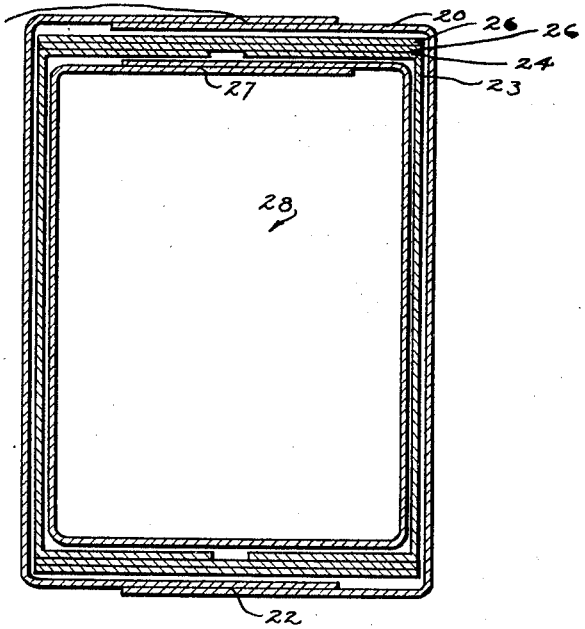
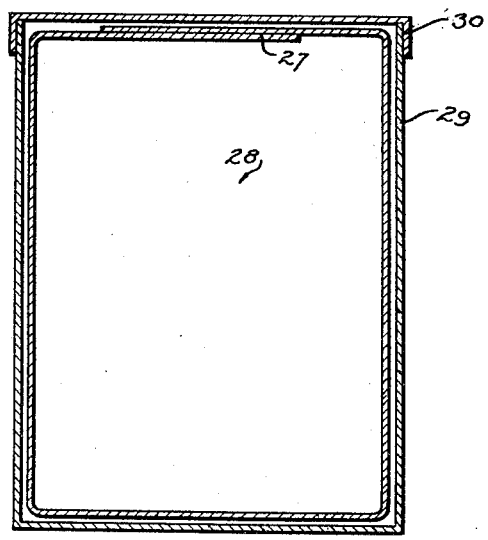
Inventor
Weston Green,
By Toulmin & Toulmin
Attorney Patented May 15, 1923.

1,454,888

UNITED STATES PATENT OFFICE.

WESTON GREEN, OF DAYTON, OHIO, ASSIGNOR TO THE GREEN & GREEN COMPANY, OF DAYTON, OHIO, A CORPORATION OF OHIO.

SYSTEM FOR SELLING AND PACKING FOOD PRODUCTS.

Application filed March 11, 1922. Serial No. 543,127.

*To all whom it may concern:*

Be it known that I, WESTON GREEN, a citizen of the United States, residing at Dayton, in the county of Montgomery and State of Ohio, have invented certain new and useful Improvements in Systems for Selling and Packing Food Products, of which the following is a specification, reference being had therein to the accompanying drawing.

My invention relates to a system for selling and packing a food product.

The object of my invention is to provide a system by which given quantities of fresh food products, such as crackers for instance, may be delivered to a customer and placed by the customer in a permanent moisture-proof receptacle. It is a further object to provide a system by which the purchase of a given number of temporary receptacles in which the crackers are bought will entitle the purchaser to a permanent moisture-proof receptacle for keeping the food products therein.

It is an additional object of my invention to provide an interior container of moisture-proof character for the food product in the temporary container which may be used to lift the food product out as a unit from the temporary container to place them in the permanent container without the necessity of handling the food products individually by hand thus maintaining them in their original condition as delivered and packed by the factory without breakage or injury.

It is my object to provide a system by which a large number of purchases may be made in relatively cheap containers which are satisfactory for containing the food products during the processes of distribution and sale and to provide a permanent container which will meet the requirements of being dustproof, moistureproof and durable as a container in a household for the food products. Generally, such a permanent container is too expensive as a container for food products to be sold with each package of the food products.

It is an additional object of my invention to provide a guaranteed package guaranteeing quality and purity in combination with a given date thereon during which the guarantee will run and I have provided a form of guarantee with a space for dating. I have also provided a form of coupon being an integral part of a temporary package. This coupon gives the name and address and dealer's name so that I am enabled to provide a system of getting customers' names, of distributing the permanent containers, of guaranteeing the freshness of the product and of securing the dealer's name to determine the volume of sales of any given dealer by incorporating in the temporary package the guarantee on one part thereof and the coupon form on the other part thereof.

I thus am enabled to have a system of forms and packages by which the sale of a plurality of the cheaper containers with the food products therein may be made and the permanent container given away as an inducement for the purchase of a given number of the temporary containers, thus providing for the customer economical purchases of the food products in containers sufficiently satisfactory for distribution and sale and a permanent container into which the food products may be placed during their current consumption in a household.

Referring to the drawings:

Fig. 3 is a section taken vertically through the temporary container and its interior removable sack in which the food product is contained and the exterior waterproof wrapping;

Fig. 4 is a section taken vertically of the permanent container and the interior sack.

Figure 1:
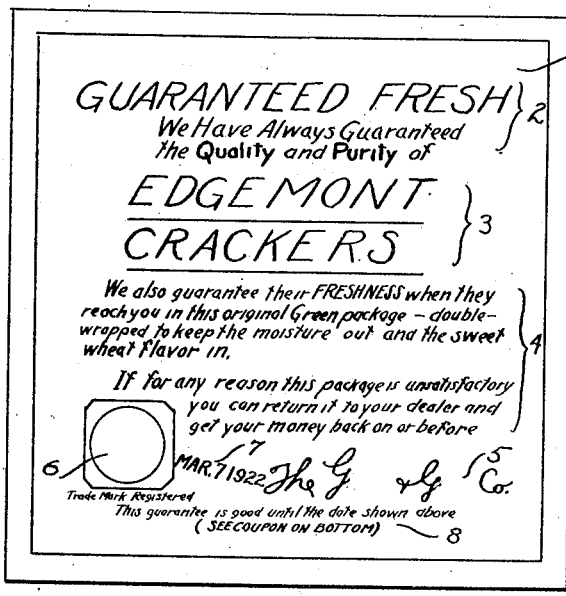
Fig. 1 is a view of the top of the temporary container illustrating the guarantee form.

Referring to the drawings in detail and in particular to Fig. 1, 1 is the paper head or side of the temporary container on which there is printed the guarantee. This is usually the one end of the temporary container so that it may be easily torn off if necessary.

Figure 2:
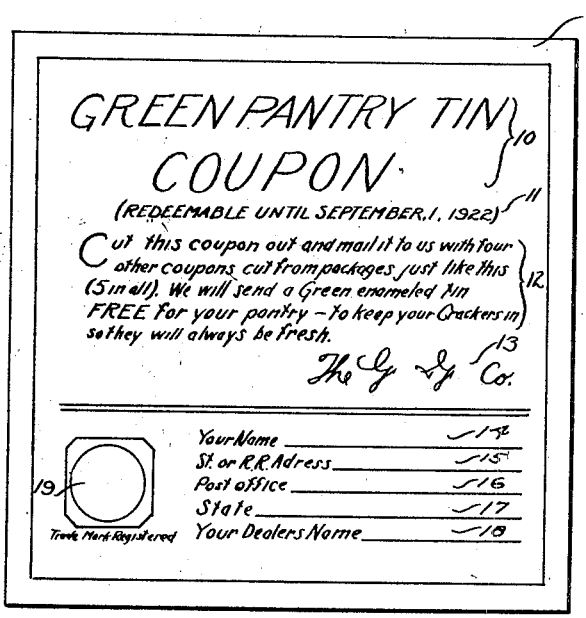
Fig. 2 is a view of the other end of the temporary container showing the coupon form.

This form contains the guarantee of freshness, designated 2, the name of the product designated 3, the detail guarantee 4, the signature 5, the trade mark 6, the guarantee date 7, and a reference at 8 to the coupon on the bottom illustrated in Figure 2.

It will be understood that this guarantee and coupon may be located any place within or without the package but it is found preferable to place the descriptive matter of the product on the side of the package together with the name of the manufacturer and the trade mark while at either end of the package, which is usually square, will be the guarantee and the coupon respectively. 9 is the coupon referring to the permanent container, known as the pantry tin. This consists of the coupon designation 10, the redeeming date 11, the terms upon which the pantry tin will be delivered generally designated 12, the manufacturer's signature 13 and the address form leaving a blank for the customer's name at 14, the street address at 15, the post office address in the blank 16, the State address in the blank 17 and the blank for dealer's name at 18. 19 is the trade mark of the manufacturer.

Referring to Fig. 3, there will be seen a paraffine wrapper 20 which is sealed at the ends 21 and 22 by passing the wrapped package between heated members, melting the paraffine and effecting the seal of the package to make it dustproof and waterproof. Within this outer casing is the card board or paper fiber container 23. The container has the end flaps usually in such boxes such as 24, 25 and 26. On 26 is mounted the guarantee 1 or the coupon guarantee as may be desired. Within this container is the paraffine paper sack 27 folded over at the top thereof and the food product is in the interior thereof at 28.

When the purchaser opens up this temporary container the temporary sack 27 is removed and placed in the metal permanent container designated 29 which has a cap top 30 that fits snugly on the top thereof.

It will be observed that 27 is moved bodily and that although 23 may be square and 29 round or vice versa, yet the yielding nature of the sack 27 will permit it to conform to the configuration of either container and the quantity of food products in the space 28 within 27 is a quantity which will fill either one of the containers.

I prefer to use a square temporary container of paper and a round permanent container of metal because it is more economical in manufacture of such containers to have those configurations for those particular materials.

It will be understood that I do not desire to confine myself to any particular location of my forms or any details of wording nor to any particular materials out of which the containers are made, nor to any particular food products. My invention relates to a system of merchandising primarily food products and the provision of suitable containers for those food products in order that they may be kept fresh, free from objectionable foreign material, free from individual handling, etc.

Having thus fully described my invention, what I claim as new and desire to secure by Letters Patent, is:—

1. A triple-sealed three ply casing comprising an inner moisture-proof complete sealed sack of material sufficiently pliable to snugly fit inside of a rigid box, and bodily removable therefrom and insertible into another box of the same or different shape and substantially the same cubical capacity, and adapted to fit the same by virtue of its pliability while in its sealed condition, a complete sealed box for containing said removable sack sufficiently rigid to maintain its shape under ordinary commercial handling, and a complete moisture-proof sealed paper cover to entirely cover said sealed box, whereby the contents of the package is doubly sealed against moisture, the written or printed matter on the sealed box is visible through the transparent cover, and whereby the contents of the sack may be preserved in a sealed condition in such other box.

2. A triple-sealed three ply casing comprising an inner moisture-proof complete sealed sack of material sufficiently pliable to snugly fit inside of a rigid box, and bodily removable therefrom and insertible into another box of the same or different shape and substantially the same cubical capacity, and adapted to fit the same by virtue of its pliability while in its sealed condition, a complete sealed box for containing said removable sack sufficiently rigid to maintain its shape under ordinary commercial handling, and a complete moisture-proof sealed paper cover to entirely cover said sealed box, whereby the contents of the package is doubly sealed against moisture, the written or printed matter on the sealed box is visible through the transparent cover, and whereby the contents of the sack may be preserved in a sealed condition in such other box, and a coupon displayed on one portion of the package and a written or printed guarantee on another portion of the package between the outer transparent paper and the box.

In testimony whereof, I affix my signature.

WESTON GREEN.